J. E. WELLS.
Apparatus for Destroying Insects on Vines.
No. 211,199. Patented Jan. 7, 1879.
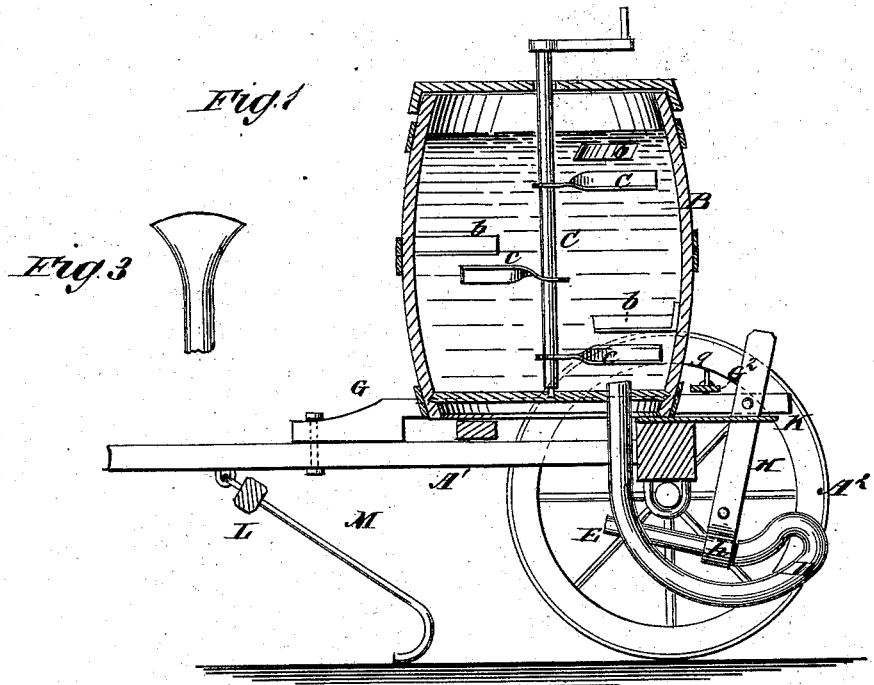
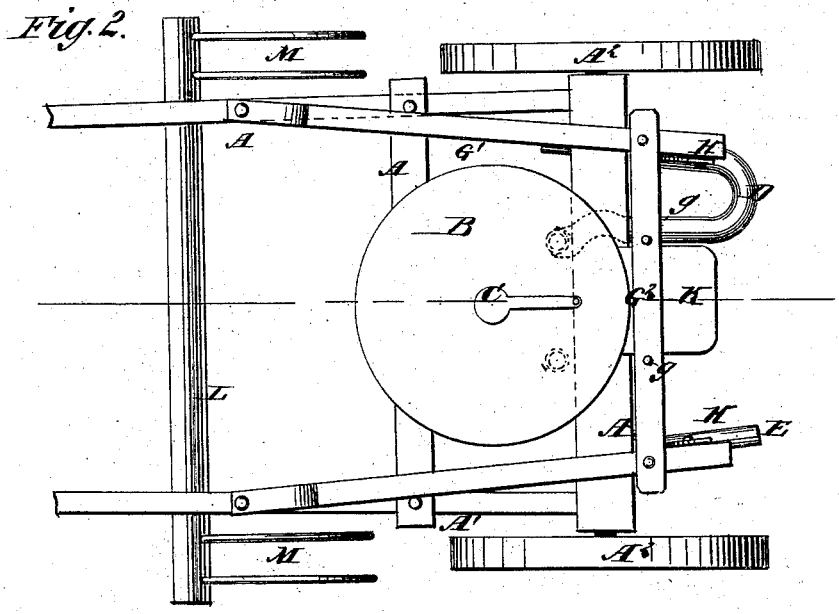
WITNESSES:
INVENTOR:
J. E. Wells
BY
ATTORNEYS.

UNITED STATES PATENT OFFICE.

JAMES E. WELLS, OF HOLMDEL, NEW JERSEY.

IMPROVEMENT IN APPARATUS FOR DESTROYING INSECTS ON VINES.

Specification forming part of Letters Patent No. 211,199, dated January 7, 1879; application filed August 27, 1878.

*To all whom it may concern:*

Be it known that I, JAMES E. WELLS, of Holmdel, in the county of Monmouth and State of New Jersey, have invented a new and useful Improvement in Apparatus for Destroying Insects on Vines, of which the following is a specification:

My invention is particularly intended for applying to potato-vines a mixture of Paris green and water for the purpose of destroying the Colorado beetle or potato-bug.

The invention consists in a novel construction, arrangement, and combination of a vessel for holding the mixture, a device for stirring it, tubes and pipes for applying it, clamps for holding said pipes, a device for oscillating them, and a carriage for holding and carrying the working parts, whereby an apparatus is produced which is easily managed by one person.

The accompanying drawing represents an apparatus embodying my improvements, Figure 1 being a vertical sectional view, and Fig. 2 a top view. Fig. 3 is a detail view hereinafter referred to.

Similar letters of reference indicate corresponding parts.

The carriage for holding and carrying the working parts may be of any suitable description. It is here shown as consisting of a framework, A, mounted on wheels $A^2$, said framework being provided with thills for the attachment of a horse.

On the frame-work A is mounted a vessel, B, for holding a mixture of Paris green and water, which vessel may consist of an ordinary barrel or cask provided with a lid or cover. On its inner surface it is provided with a number of stationary wings, $b$.

In the center of the vessel B works a vertical shaft, C, having its bearings in the bottom and the cover of said vessel. This shaft is provided with a suitable number of wings or dashers, $c$, which revolve with it, and also has a crank or handle for turning it. By this means the mixture can be thoroughly stirred and agitated, in order to prevent the Paris green from settling.

To the bottom of the vessel the upper ends of the two flexible tubes D D are attached, the opposite ends of said tubes being attached to pipes or nozzles E E. The end of each pipe or nozzle is provided with a rose or sprinkler, which may be of any suitable description, but is preferably of the form shown in Fig. 3, being flattened, and with a rounded front end, so as to deliver the liquid in a fan-shaped stream. A piece of wire-gauze may, if desired, be arranged in front of the rose, so as to scatter the liquid in the form of spray.

Near the front of the frame A, on the upper side thereof, two bars, G G, have their front ends pivoted, so as to allow them to oscillate in a horizontal plane. These bars are arranged one on each side of the vessel B, and their rear ends are connected by a cross-bar, $G^2$, bolted loosely thereto. From the rear end of each bar G hangs a bar, H, the lower end of which is formed into a clamp, $h$, for holding the nozzle E, which may be pointed either forward or rearward.

On the upper surface of the cross-bar $G^2$ are two studs or projections, $g\ g$, and immediately below said cross-bar is a platform, K. The operator stands on the platform K, and with his foot presses alternately against the projections $g\ g$, so as to oscillate the bars G G and scatter the liquid from the nozzles E E in a thorough manner over the vines, while with one hand he turns the shaft C and stirs the mixture.

The upper ends of the tubes D D may be provided with valves of any suitable description.

To the front portion of the frame A a bar, L, is loosely connected by means of links or staples. This bar carries near its ends, immediately in front of the wheels $A^2$, a suitable number of hooks, M, which drag on the ground and rake the vines out of the way, so that they will not be bruised or injured by the wheels.

Having thus described my invention, what I claim as new, and desire to secure by Letters Patent, is—

1. The combination, with the vessel B, of the flexible tubes D and nozzles E, provided with the clamping-bars H for holding them, substantially as herein described.

2. The combination, with the tubes D and nozzles E, of the pivoted longitudinal bars G G and cross-bar $G^2$ and the studs or projections $g$ $g$, substantially as and for the purpose herein described.

3. The combination, with the vessel A and its carrying-frame and carriage and the oscillating bars G $G^1$ $G^2$, of the platform K, arranged as described, whereby the operator is enabled to stand in suitable position for oscillating the bars and stirring the mixture, substantially as herein described.

JAMES ELDRED WELLS.

Witnesses:
SELAH B. WELLS,
JAMES E. JOHNSON.